Patented Mar. 8, 1938

2,110,642

UNITED STATES PATENT OFFICE 2,110,642

MANUFACTURE OF CELLULOSE ESTERS

Harold Allden Auden, Banstead, and Hanns Peter Staudinger, Epsom, England, assignors to Ernst Berl, Pittsburgh, Pa.

No Drawing. Application January 25, 1936, Serial No. 60,880. In Great Britain February 7, 1935

3 Claims. (Cl. 260—101)

This invention relates to the manufacture of cellulose esters. The present process is of the two-stage type, the cellulosic material to be esterified being first treated in any known manner using for example acetic acid containing a small amount of sulphuric or perchloric acid, after which the surplus acid mixture is drained off and the cellulosic material thus pretreated is then subjected to esterification with an acid anhydride. When esterifying in suspension it is customary to employ as a non-solvent diluent either a hydrocarbon or a chlorinated hydrocarbon. The chief object of the present invention is to provide a new or improved two-stage process in which esterification in suspension of the pretreated cellulosic material proceeds more smoothly and with less liability to undesirable rise in temperature than hitherto and in which esters of uniform and valuable properties are obtained.

According to the present invention the esterification in suspension is carried out with the aid, as diluent, of an aliphatic ester that is a non-solvent for the cellulose ester to be produced. Preferably the aliphatic ester employed corresponds to the same acid as that which corresponds to the cellulose ester to be produced; for example in making cellulose triacetate the preferred aliphatic ester employed as diluent during esterification is ethyl, propyl, or butyl acetate or a mixture thereof, in making cellulose tri-propionate the preferred aliphatic ester is ethyl, propyl, or butyl propionate or a mixture thereof, and in making cellulose tributyrate the preferred aliphatic ester is ethyl, propyl or butyl butyrate or a mixture thereof.

The use of aliphatic esters corresponding to the acid of which the anhydride is used in making the cellulose ester is of course advantageous in the case of manufacture of simple cellulose esters. It is however possible to make mixed esters of cellulose according to the invention that is to say cellulose esters containing two or more acid radicals. Small amounts of a second acid radical in the cellulose ester may be introduced by using the anhydride of the acid corresponding to the lower acid radical together with the aliphatic ester containing the higher acid radical in which case this aliphatic ester will act (in the presence of the anhydride) both as auxiliary esterifier and as diluent. An alternative method of introducing a second acid radical into the eventual cellulose ester is by employing a mixture of aliphatic esters, one serving as diluent and the other (in the presence of the anhydride) as auxiliary esterifier, the latter being an ester of the higher acid the radical of which is desired in the product; for example in order to make a mixed cellulose ester containing acetyl and propionyl radicals we may employ acetic anhydride as esterifier proper and a mixture of ethyl propionate or butyrate (as auxiliary esterifier) and ethyl acetate (as diluent).

In place of esters of the normal alcohols, we may use esters of secondary or iso-alcohols provided they are non-solvents for the ester to be produced.

The esterification may be carried out according to the known methods of esterification in suspension. It is preferably commenced at a low temperature, about 0° C. and the temperature is allowed to rise during esterification. About 2½ to 5 parts of esterifying agent are used for each part of cellulosic material to be esterified and about 5 to 10 parts of ester for each part of cellulosic material to be treated.

The following examples illustrate the manner in which the invention can be carried into effect:—

Example 1

100 parts of cotton linters containing less than 6% moisture were pretreated with 1200 parts acetic acid of 97% strength containing 0.3% $H_2SO_4$, during 16 hours at 25° C. Afterwards the pretreating liquid was drained off and the adherent part of it was removed by replacing with 300 parts of ethyl acetate. To the pretreated linters, containing still the 300 parts of ethyl acetate, was added a mixture of 550 parts of acetic anhydride and 550 parts of ethyl acetate, previously cooled down to —5° C. The whole was then kept for 3 hours at 5° C. or below, and then the temperature was raised slowly up to 30° C. during 6 hours. At this temperature the mass remained for 16 hours. After the end of the acetylation, the acetylation mixture was drained off and separated by replacing with ethyl acetate, which in turn was replaced by water. The resulting cellulose acetate was washed with hot water three times and stabilized in any known manner, e. g. boiling with weak sodium sulphate solution. The acetate showed a clear solubility in methylene chloride and stood a heat test of 30 mins. at 238° C. without considerable discolouring.

Example 2

100 parts of cotton linters normally dry were pretreated with 1500 parts of acetic acid of 97.5% strength containing 0.25% $H_2SO_4$ during 24 hours at 25 to 27° C. During the pretreatment the liquid was kept in circulation. After draining off the main bulk of the pretreating liquid, the linters were pressed to such an extent as to contain only 100 parts of acetic acid. A mixture of 550 parts of acetic anhydride and 800 parts of isopropyl acetate, cooled down to —5° C., was added to the linters, and the whole mass kept below 5° C. for 4 hours. Then the temperature was allowed to rise to 30° during 6 hours. After 24 hours at 30° C. the product became chloroform-soluble and the acetylating liquid was drained off and replaced by an excess of isopropyl acetate. After draining off the replacing liquid with water, the resulting cellulose acetate was steamed and afterwards washed and boiled with water and stabilized as in Example 1.

Example 3

100 parts of cotton linters were immersed in a bath consisting of 3000 parts of glacial acetic acid, 70 parts of water and 7.5 parts of $H_2SO_4$. After 2 hours at 27° C. the pretreating liquid was separated off and the linters were pressed so that the amount of pretreating liquid left behind was only 100 parts. After opening up these pressed linters, they were kept in a closed container for 3 hours at 42° C. Then was added a mixture of 500 parts of acetic anhydride and 700 parts of n-propyl acetate (as diluent), previously cooled down to —5° C. In this mixture the linters were kept for 1 hour at 0° C. Then the temperature was allowed to rise to 20° C. in 3 hours and kept for 15 hours at that temperature. Then the temperature was raised for 3 hours to 40° C. As the acetate showed clear solubility in methylene chloride, the main bulk of the liquid was removed by replacing with the above mentioned diluent, which in turn was replaced by water. After washing out and boiling the resultant cellulose acetate several times with water, the stabilization was effected as in Example 1.

Example 4

100 parts of cotton linters containing 6% water were preheated with 1500 parts of acetic acid of 98.5% strength containing 4 parts of $H_2SO_4$ for 16 hours at 25° C., the liquid being circulated through the linters. Then the linters were separated from the liquid to such an extent that they contained 150 parts of the pretreating liquid. A mixture of 240 parts of acetic anhydride and 600 parts of ethyl acetate previously cooled down to —5° C. was then added, the temperature was kept for 2 hours at 0° C. and then slowly raised to 33° C. in 2 hours. At 33° C. the whole mass remained for 48 hours. After a sample showed good solubility in chloroform, 2000 parts of water were stirred in and the resultant cellulose acetate was separated off by centrifuging. The cellulose acetate was washed with hot water and stabilized as in Example 1. The top layer of the liquid bulk containing the main part of the acetic acid was separated, and the lower more aqueous layer, containing the rest of the acetic acid, was re-used for the isolation of a new batch.

Example 5

100 parts of air-dry linters were pretreated with 1500 parts of propionic acid of 94% strength containing 4 parts of concentrated sulphuric acid as a catalyst. After 16 hours at 25° C. the acid was separated by pressing the linters so as to retain 90 parts of the pretreating liquor. A mixture of 350 parts of propionic anhydride and 800 parts of propyl-propionate, previously cooled to —7° C., was then added to the linters and the temperature kept for 5 hours below 5° C. After raising the temperature slowly to 33° in 3 hours, it was maintained for 44 hours between 30 and 33° C. The whole mass was in a highly swollen condition and the separation was effected by stirring into the mass water containing sufficient sodium acetate to neutralize the free sulphuric acid, and heating up to boiling point. The resulting cellulose propionate was then filtered off and washed with alcohol and dried.

Example 6

100 parts of cotton linters containing 3% moisture were immersed in 1000 parts of acetic acid of 97% strength, containing 0.3% $H_2SO_4$. After 24 hours at 27° the linters were pressed to such an extent that 200 parts of pretreatment liquid remained in the linters. To these linters was added a cooled mixture of 400 parts of acetic anhydride and 700 parts of propyl propionate. The mass was kept for 5 hours at 3° C. and then the temperature was allowed to rise slowly to 30° C. in 3 hours. After 24 hours at 30° C. the cellulose acetate showed clear solubility in methylene chloride and was therefore separated off from the main bulk by draining off. The adherent acetylation liquid was centrifuged off and in the centrifuge the cellulose acetate was washed first with propyl-propionate and then with water. The cellulose acetate was then washed with hot water, boiled twice and stabilized as in Example 1. The resultant cellulose acetate showed slightly different solubility in organic solvents from the solubility of the acetate of the preceding examples due to the fact that it contained also propionyl-radical to a small extent.

Example 7

100 parts of cotton linters containing 5% moisture were pretreated with a mixture of 1100 parts acetic acid of 97.6% strength and 3 parts $H_2SO_4$ for 20 hours at 27° C. The pretreating liquid was then pressed off so that only 70 parts of the same remained in the linters. These linters were then immersed in a cooled bath containing 500 parts of acetic anhydride and 800 parts of butyl propionate. The acetylation liquid was circulated through the linters and the temperature was kept at 10° C. for 3 hours. After raising the temperature to 25° C. in 3 hours, the whole mass remained at this temperature for 18 hours. The resulting cellulose ester containing also propionyl radical to a small extent was separated, by centrifuging, from the acetylating mixture and was washed and stabilized as in Example 4.

Example 8

100 parts of air-dry linters are immersed for 16 hours in a bath consisting of 1500 parts of acetic acid of 97.6% strength and 3.75 parts of concentrated sulphuric acid. The temperature was kept at 25 to 26° C. After draining off the bulk of the pretreating liquid the linters were pressed so as to retain 100 parts of said liquid. A cooled mixture of 500 parts of acetic anhydride, 300 parts of methyl acetate, and 500 parts of isopropyl-acetate was then added and the whole was kept for 5 hours at 0° C.; then the temperature was raised to 33° C. in 3 hours and kept at this temperature for 16 hours. When a sample showed a clear solubility in methylene chloride, the bulk of the acetylating mixture was drained off and the remainder replaced by iso-propyl-acetate. The resultant cellulose acetate was then heated directly with steam and the diluent recovered by condensation. Stabilization was carried out as in Example 1.

*Example 9*

100 parts of cotton linters were pretreated as in Example 8, but the amount of pretreating liquor left in the linters was 120 parts. An esterification mixture consisting of 500 parts of acetic anhydride, 400 parts of ethyl acetate and 400 parts of ethyl butyrate, previously cooled to about —5° C., was added to the pretreated linters and the temperature was maintained for 5 hours at 0°-3° C. The acetylation was completed after 20 hours at the latter temperature. The separation of the cellulose acetate from the liquor was effected by replacing with ethyl acetate, then replacing the latter with hot water and steaming out the rest and condensing it. Stabilization was carried out as in Example 1.

The foregoing examples may be summarized as follows:—

Examples 1 to 4 result in the simple ester, cellulose acetate.

Example 5, results in the simple ester, cellulose propionate.

Examples 6 and 7 result in a mixed ester owing to the diluent employed also having an auxiliary esterifying effect.

Example 8 results in a simple ester-cellulose acetate, but with the aid of a mixture of aliphatic esters as diluent.

Example 9 results in a mixed ester containing a substantial quantity of acetyl radical and a certain amount of butyryl radical because in addition to a diluent proper there is also used an ester serving as auxiliary esterifier.

What we claim is:—

1. A two-stage process for the manufacture of aliphatic esters of cellulose including a pretreating stage and an esterfying stage, said process comprising, in the first stage, pretreating the cellulose with an acid pretreating agent to effect swelling without substantial degradation thereof and to render it suitable for complete and uniform esterification, separating the pretreated cellulose from said pretreating agent and then, in the second stage, esterifying the pretreated mass while retaining it in suspension with the aid of a diluent comprising essentially an ester formed from a lower monohydric aliphatic alcohol and a lower monocarboxylic aliphatic acid, said ester being a non-solvent with respect to the cellulose ester produced, said first stage being carried out at a temperature not substantially in excess of about 25-27° C., and said second stage being carried out at a temperature not substantially in excess of about 25-40° C.

2. A two-stage process for the manufacture of aliphatic esters of cellulose including a pretreating stage and an esterifying stage, said process comprising, in the first stage, pretreating the cellulose with an acid pretreating agent to effect swelling without substantial degradation thereof and to render it suitable for complete and uniform esterification, separating the pretreated cellulose from said pretreating agent and then, in the second stage, esterifying the pretreated mass while retaining it in suspension with the aid of a diluent comprising essentially a mixture of esters formed from lower monohydric aliphatic alcohols and lower monocarboxylic aliphatic acids, said mixture being a non-solvent with respect to the cellulose ester produced, said first stage being carried out at a temperature not substantially in excess of about 25-27° C., and said second stage being carried out at a temperature not substantially in excess of about 25-40° C.

3. A two-stage process for the manufacture of aliphatic esters of cellulose including a pretreating stage and an esterifying stage, said process comprising, in the first stage, pretreating the cellulose with an acid pretreating agent to effect swelling without substantial degradation thereof and to render it suitable for complete and uniform esterification, separating the pretreated cellulose from said pretreating agent and then, in the second stage, esterifying the pretreated mass by means of an acid anhydride as esterifier while retaining it in suspension with the aid of a diluent comprising essentially an ester formed from a lower monohydric aliphatic alcohol and a lower monocarboxylic aliphatic acid, said ester being a non-solvent with respect to the cellulose ester produced and said anhydride being the anhydride of the said acid, said first stage being carried out at a temperature not substantially in excess of about 25-27° C., and said second stage being carried out at a temperature not substantially in excess of about 25-40° C.

HAROLD ALLDEN AUDEN.
HANNS PETER STAUDINGER.